US010287378B2

(12) United States Patent
Debling et al.

(10) Patent No.: US 10,287,378 B2
(45) Date of Patent: May 14, 2019

(54) HYDROPHILIC, LOW ACID CONTENT POLYMERS AS STABILIZERS FOR WATER-BASED EMULSIONS

(71) Applicant: BASF SE, Ludwigshafen (DE)

(72) Inventors: Jon A. Debling, Saline, MI (US); Sarav Bharat Jhaveri, Lincoln Park, MI (US)

(73) Assignee: BASF SE, Ludwigshafen (DE)

( * ) Notice: Subject to any disclaimer, the term of this patent is extended or adjusted under 35 U.S.C. 154(b) by 118 days.

(21) Appl. No.: 14/403,089

(22) PCT Filed: May 23, 2013

(86) PCT No.: PCT/US2013/042482
§ 371 (c)(1),
(2) Date: Nov. 21, 2014

(87) PCT Pub. No.: WO2013/177435
PCT Pub. Date: Nov. 28, 2013

(65) Prior Publication Data
US 2015/0166702 A1 Jun. 18, 2015

Related U.S. Application Data

(60) Provisional application No. 61/651,427, filed on May 24, 2012.

(51) Int. Cl.
| *C08F 220/06* | (2006.01) |
| *C08F 220/14* | (2006.01) |
| *C08F 220/18* | (2006.01) |
| *C08F 265/06* | (2006.01) |
| *C09D 11/00* | (2014.01) |
| *C09D 11/106* | (2014.01) |
| *C09D 133/02* | (2006.01) |
| *C09D 133/12* | (2006.01) |
| *C09D 133/14* | (2006.01) |

(52) U.S. Cl.
CPC .......... *C08F 220/06* (2013.01); *C08F 220/14* (2013.01); *C08F 220/18* (2013.01); *C08F 265/06* (2013.01); *C09D 11/00* (2013.01); *C09D 11/106* (2013.01); *C09D 133/02* (2013.01); *C09D 133/12* (2013.01); *C09D 133/14* (2013.01)

(58) Field of Classification Search
CPC .... C08F 220/06; C08F 220/14; C08F 220/18; C08F 265/06; C09D 11/106; C09D 133/02; C09D 133/14; C09D 11/00; C09D 133/12
See application file for complete search history.

(56) References Cited

U.S. PATENT DOCUMENTS

| 3,825,514 A | 7/1974 | Drury, Jr. et al. |
| 3,825,814 A | 7/1974 | Pelly |
| 3,980,602 A * | 9/1976 | Jakubauskas ......... C09B 67/009 524/431 |
| 4,414,370 A | 11/1983 | Hamielec et al. |
| 4,668,730 A | 5/1987 | Iovine et al. |
| 4,973,614 A | 11/1990 | Yoshino et al. |
| 5,231,131 A | 7/1993 | Chu et al. |
| 5,804,676 A | 9/1998 | Hieda et al. |
| 6,552,116 B1 | 4/2003 | Pakusch et al. |
| 7,910,663 B2 | 3/2011 | Taylor et al. |
| 2004/0068043 A1 | 4/2004 | Tsukiyama |
| 2008/0027177 A1* | 1/2008 | Nishikawa .......... C04B 24/2647 525/170 |

FOREIGN PATENT DOCUMENTS

| CN | 101597355 | 12/2009 |
| JP | H812396 A | 1/1996 |
| JP | H08-113749 A | 5/1996 |
| JP | 2003-286304 A | 10/2003 |
| JP | 2004-292520 | 10/2004 |
| JP | 2006-299253 | 11/2006 |
| JP | 2006-525938 A | 11/2006 |
| JP | 3952948 B2 | 8/2007 |
| WO | WO-03/064479 | 8/2003 |
| WO | WO-03/070799 | 8/2003 |

OTHER PUBLICATIONS

First Examination Report received for Chilean Patent Application No. 03180-2014 dated Oct. 2, 2015 (10 pages).
First Office Action received for Chinese Patent Application No. 201380026982.5 dated Oct. 20, 2015, with English Translation (18 pages).
International Preliminary Report on Patentability received for Patent Application No. PCT/US2013/042482 dated Dec. 4, 2014, 9 pages.
International Search Report and Written Opinion received in Application No. PCT/US2013/042482 dated Nov. 12, 2013 (11 pages).
Database CA Online—Chemical Abstracts Service, Fei, Hua et al: Water-soluble ink based on acrylic resins, XP002751359, Database accession No. 2002:420439, retrieved from the Nov. 2015.
Database CA Online—Chemical Abstracts Service, Kano, Hitonoriet al: Water-thinned printing inks for plastic films and their laminates, XP002751358, Database accession No. 1996:476641, May 7, 1996.
Database CA Online—Chemical Abstracts Service, Tanii, Ichiroet al: Emulsion binders for aqueous printing, XP002751357, Database accession No. 1998:423996, Jun. 30, 1998.
Database WPI Week 200708—Chemical XP002751361, Nov. 2, 2006.
Database WPI Week 201006, XP002751362, Dec. 9, 2009.
Extended European Search Report issued on EP 13793402.2, dated Mar. 1, 2016.
Office Action issued on Chile application 201380026982.5, dated Apr. 11, 2016, English translation not available.

(Continued)

*Primary Examiner* — Patrick D Niland
(74) *Attorney, Agent, or Firm* — Foley & Lardner LLP (57) ABSTRACT

A hydrophilic low acid content resin includes a polymerization product of a mixture including at least one (meth)acrylate and at least one (meth)acrylic acid; wherein the resin is water soluble; and the resin exhibits an acid value from 0 to about 120.

17 Claims, 1 Drawing Sheet

(56) References Cited

OTHER PUBLICATIONS

Second Office Action received for Chinese Patent Application No. 201380026982.5 dated Jun. 16, 2016, 12 pages with English translation.
Communication pursuant to Article 94(3) EPC in EP Application No. 13793402.2, dated Jun. 27, 2017 (7 pages).
Notification of Reasons for Refusal dated Mar. 6, 2017 in JP Application No. 2015-514198 (English translation—9 pages).
Notification of Reasons for Refusal in JP Application No. 2015-514198, dated Sep. 4, 2017 (English translation only—8 pages).

* cited by examiner

_(1)_

HYDROPHILIC, LOW ACID CONTENT POLYMERS AS STABILIZERS FOR WATER-BASED EMULSIONS

CROSS-REFERENCE TO RELATED APPLICATIONS

This application is the U.S. National Stage of International Application No. PCT/US2013/042482, with international filing date May 23, 2013, which claims the benefit of and priority to U.S. Provisional Application No. 61/651,427 filed May 24, 2012, the contents of which are incorporated herein by reference in their entireties.

FIELD

The present technology generally relates to water-based polymer compositions for use in applications including inks, coatings, and adhesives.

BACKGROUND

Waterborne inks, coatings, and adhesives are commonly applied to a variety of substrates including plastic films, paper, metal, concrete and board stock. They are an attractive and environmentally friendly option to solvent-borne systems which tend to have a substantial content of volatile organic compounds (VOCs). However, one deficiency of waterborne systems is the lack of adhesion and permanent resistance to water and other chemicals such as isopropanol, oils, greases, solvents, etc. One reason for this is the nature of the composition of the ink or coating system. Typically, waterborne systems include emulsion polymers supported by surfactants. The presence of these surfactants (necessary for forming a stable emulsion) in small quantities deteriorates the resistance properties of the final dried ink/coating. Alternatively, the emulsion polymerization may be supported using acid functional styrene-acrylic protective polymer colloids in place of surfactants. These improve resistance properties and also provide additional benefits such as resolubility (the ability of the press to recover print after the press has stopped) of the inks on the press. Unfortunately, for certain applications such as printing inks on films, the resistance properties are still not sufficient when using traditional protective colloids with high acid content.

Low molecular weight acid functional acrylic polymers are often used as protective colloids in emulsion polymerization. These materials can be conveniently made in a high-temperature, continuous polymerization process, typically above 175° C. Usually, styrenic monomers and/or acrylates and methacrylates are used as comonomers. The incorporation of styrene yields hard and cost effective polymers, however, this also requires high levels of acid monomer incorporation so as to be dispersible in water with a suitable base, such as ammonia, for example.

To address the above issues, additional cross-linkers, such as aziridines, carbodiimides, zinc compounds or zirconium compounds, may be added to react with the acid groups. However, such approaches also have drawbacks, including cost to the final product and toxicity or stability issues related to the cross-linkers. Thus, there is a need for a stable waterborne emulsion system that can be cross-linked with a cost effective amount of cross-linker to give acceptable resistance properties, while maintaining important properties such as ink resolubility.

SUMMARY

In one aspect, a hydrophilic low acid content resin includes a polymerization product of a mixture comprising at least one (meth)acrylate, and at least one (meth)acrylic acid, where the resin is water soluble upon neutralization; and the resin exhibits an acid value from 0 to about 120. In some embodiments, the at least one (meth)acrylate comprises ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate. In any of the above embodiments, the at least one (meth)acrylic acid includes acrylic acid, methacrylic acid, itaconic acid, maleic acid, fumaric acid, or crotonic acid, or an anhydride of any thereof.

In one embodiment, the mixture includes at least two (meth)acrylates selected from the group consisting of ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate; and at least one a (meth)acrylic acid selected from the group consisting of acrylic acid, methacrylic acid, itaconic acid, maleic acid, fumaric acid, crotonic acid, or an anhydride thereof. In one embodiment, the mixture includes methyl methacrylate, methyl acrylate, and acrylic acid.

In any of the above embodiments, the acid value is from about 20 to about 90. For example, the acid value may be from about 20 to about 60. In any of the above embodiments, the polymerization product has a weight average molecular weight from about 2,000 g/mol to about 30,000 g/mol. For example, the polymerization product may have a weight average molecular weight from about 6,000 g/mol to about 12,000 g/mol. In any of the above embodiments, the polymerization product has a glass transition temperature from about −60° C. to about 150° C. For example, the polymerization product may have a glass transition temperature from about 0° C. to about 75° C.

In any of the above embodiments, the mixture may be free of styrenic monomers. In any of the above embodiment, the resin may have an $O_2$ value from about 20 to about 38. For example, this includes an $O_2$ value from about 26 to about 38, or from about 34 to about 38.

In another aspect, a process is provided including combining at least one (meth)acrylate, at least one (meth)acrylic acid, and an initiator to form a mixture; agitating the mixture until a clear solution is obtained; and introducing the clear solution to a reactor held at a temperature sufficient to polymerize the at least one (meth)acrylate and the at least one (meth)acrylic acid and form a hydrophilic, low acid content resin, where the hydrophilic, low acid content resin exhibits an acid value from 0 to about 120. In one embodiment, the mixture is free of styrenic monomers.

In another aspect, an emulsion is provided including any of the above resins as a protective colloid, and a second polymerization product of at least one emulsion polymerizable monomer. In the emulsions, the at least one emulsion polymerizable monomer may include acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, α-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, or vinyl chloride.

In another aspect, a process is provided for preparing the above emulsions, the process including polymerizing at least one emulsion polymerizable monomer in the presence of water, a surfactant, any of the above resins, and a base.

In another aspect, coating compositions are provided which include any of the above emulsions, an aqueous medium, and a cross-linker. Such coating compositions may be an ink.

DETAILED DESCRIPTION

The illustrative embodiments described herein and in the claims are not meant to be limiting. Other embodiments may be utilized, and other changes may be made, without departing from the spirit or scope of the subject matter presented here. The present technology is also illustrated by the examples herein, which should not be construed as limiting in any way.

Films and coatings prepared with water-based emulsions containing low levels of acid functionality have better resistance to water and certain basic chemicals (such as ammonia, ethanol, isopropanol, sodium hydroxide, etc.) compared to their higher acid counterparts. This is due to differences in the solubility parameter of the polymer composition which varies the dissolution rate of the polymer in different solvents. The solubility parameters of polymers are typically defined by Hansen solubility parameter or Hildebrand solubility parameter models and give an indication of the solubility or dissolution of the polymer in a given solvent of choice. Provided here are low acid support resins for use in preparing emulsions with very low acid levels (low acid numbers). The support resin address issues with the stability of the emulsion during the polymerization, due to inadequate stabilization of the latex particle.

In one aspect, a hydrophilic, low acid-content (HLAC) support resin is provided. The HLAC support resin is suitable for dissolution in water to provide a clear solution upon neutralization of the resin. Upon dissolution in water the HLAC resins may be used for further emulsion polymerizations, which may be used in a variety of inks and coatings.

The HLAC resins provide for a number of advantages in the preparation of the resin and emulsions prepared with the resins, and also in the properties of coating which incorporate the emulsions and resins. For example, emulsions prepared with such resins are less corrosive due to the low acid content. Thus, the coatings may find application as polymer coatings on metal substrate. The emulsions prepared with such resins show improved water and base resistance. Thus, the coatings may find application as architectural coatings due to improved water scrub resistance. Additionally, inks and coatings prepared with the HLAC resins exhibit good resistance properties at economical cost (due to lower amounts of crosslinkers), and they also provide for good resolubility on press, when used in ink compositions. The HLAC resins allow for more environmentally friendly inks and coatings. For example, due to the low acid content, the HLAC resins may be dissolved in aqueous solution with a minimum amount of volatile amine bases, and where the resins are free of volatile styrenic monomers such as styrene and alpha methyl styrene, the resins have a lower overall volatile impact on the environment. Further, dispersions which are based upon the HLAC resins require relatively low amounts of toxic or difficult to handle cross-linkers in order to form resistant inks and coatings.

The HLAC support resins described herein also require lower amounts of a cross-linker in final film applications in order to achieve good resistance properties in the final dried films. Accordingly, although the HLAC support resins may be used to form emulsions for inks and other coatings, the amount of cross-linkers such as aziridines, carbodiimides, oxazolines, zinc, or zirconium curing agents that are necessary is significantly diminished in comparison to convention support resin compositions. Coatings made using emulsions prepared using HLAC resin also have improved water resistance and resistance towards bases (IPA, Ethanol, etc.)

HLAC resin are provided including the polymerization product of a mixture of monomers. The mixture includes at least one (meth)acrylate and at least one (meth)acrylic acid. As used herein, the terms (meth)acrylate and (meth)acrylic may refer to either the acrylate or methacrylate compounds being described. They are encompassing terms of the class of acrylates, methacrylates, and their acids. In some embodiments, the mixture includes from 0 wt % to about 10 wt % styrenic monomeric units. In other embodiments, the mixture is free of styrenic monomers. Such HLAC resins are water soluble, hydrophilic, and have a low acid content.

As introduced above, the HLAC resin has a low acid content value, yet despite the low content, the polymers are water soluble in an alkali solution. The low acid content of the HLAC resin is from 0 to about 120. The alkali solution may contain a base such as ammonia; a mono-, di-, or tri-alkyl amine such as, but not limited to methylamine, ethylamine, dimethylamine, diethyl amine, trimethylamine, triethylamine, methyldiethylamine, ethyldimethylamine, pyridine, piperidine, 4-methylpiperidine, diazabicycloundecene, or dimethylethanolamine; ethanolamine, sodium bicarbonate; potassium bicarbonate; sodium hydroxide; or potassium hydroxide. The alkali reacts with the low acid content of the HLAC resin to form ion salts at the carboxylate groups of the polymer, thereby enhancing the water solubility characteristics of the polymer. For example, the HLAC may react with ammonia to form an ammonium group associated with the conjugate base of an acid group on the polymer.

In the mixture, the at least one (meth)acrylate includes, but is not limited to, ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate. The at least one (meth)acrylate may include one, two, three, four, or more different (meth)acrylate monomers.

In the mixture, the at least one (meth)acrylic acid includes, but is not limited to, acrylic acid, methacrylic acid, itaconic acid, maleic acid, fumaric acid, or crotonic acid. The term (meth)acrylic acid also includes the anhydrides of any acids listed, because the materials being prepared in water will hydrolyze the anhydride to generate the acid. The at least one (meth)acrylic acid may include one, two, three, four, or more, different (meth)acrylic acid monomers.

In one embodiment, the mixture includes at least two (meth)acrylates selected from ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate; and at least one a (meth)acrylic acid selected from acrylic acid, methacrylic acid, itaconic acid, maleic acid, fumaric acid, and crotonic acid. In one embodiment, the mixture includes methyl methacrylate, methylacrylate, and acrylic acid.

As noted, the acid value of the HLAC resin may be from 0 to 120. In some embodiments, the acid value is from 0 to about 80. In some embodiments, the acid value is from about 20 to about 60. As used herein, acid value is determined by titration of the bulk resin dissolved in tetrahydrofuran (THF) with a 0.1N NaOH aqueous solution.

In another measure of the polymerization product, each HLAC resin has an oxygen content expressed as wt % $O_2$. This is referred to as the $O_2$ value. In any of the HLAC resins, the $O_2$ is from about 20 to about 40. This includes $O_2$ values of from about 23 to about 38, or those from about 26 to about 38. In one embodiment, the $O_2$ value of the HLAC resin is from about 34 to about 38. In one embodiment, the $O_2$ value of the HLAC resin is from about 34 to about 37.

The polymerization product has a weight average molecular weight from about 2,000 g/mol to about 30,000 g/mol. This includes polymerization products having a weight average molecular weight from about 6,000 g/mol to about 12,000 g/mol. This includes polymerization products having a weight average molecular weight from about 6,000 g/mol to about 10,000 g/mol. The number average molecular weight of the polymerization product may be from about 2,000 g/mol to about 5,000 g/mol.

The polymerization product may exhibit a glass transition temperature of from about −60° C. to about 150° C. This includes polymerization products exhibiting a glass transition temperature from about 0° C. to about 75° C.

To achieve the low acid value content of the polymerization product, the mixture incorporate a low level of a (meth)acrylic acid. For example, the mixture may include from about 1 wt % to about 16 wt % of the at least one (meth)acrylic acid, based upon the total weight of monomers in the mixture. In one embodiment, the mixture includes from about 3 wt % to about 12 wt % of the at least one (meth)acrylic acid, based upon the total weight of monomers in the mixture. The bulk of the mixture is based upon the (meth)acrylate monomer. For example, the mixture may include from about 88 wt % to about 99 wt % of the at least one (meth)acrylate, based upon the total weight of monomers in the mixture. In one embodiment, the mixture may include from about 3 wt % to about 12 wt % of the at least one (meth)acrylic acid, from about 25 wt % to about 65 wt % of a first (meth)acrylate and from about 30 wt % to about 50 wt % of a second (meth)acrylate, based upon the total weight of monomers in the mixture. In mixtures having a first, a second, or more, (meth)acrylate monomer, no two are the same (meth)acrylate monomer.

In another aspect, a process of preparing an HLAC support resin is provided. The process includes combining the monomers in a solvent (optional), adding an initiator, and agitating until the resulting solution is clear. Once clarity of the solution is obtained, it may be continuously fed into a reactor maintained at a temperature that is sufficient to polymerize the at least one (meth)acrylate and the at least one (meth)acrylic acid to form the HLAC resin. Thus, the process includes charging into a reactor a mixture of at least one (meth)acrylate monomer, at least one (meth)acrylic acid monomer, and optionally at least one initiator. The HLAC resin thus prepared exhibits an acid value from 0 to about 120. This includes acid values of from 0 to about 80, and acid values of from about 20 to about 60.

In the mixture, the at least one (meth)acrylate includes, but is not limited to, ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate. The at least one (meth)acrylate may include one, two, three, four, or more different (meth)acrylate monomers.

In the mixture, the at least one (meth)acrylic acid includes, but is not limited to, acrylic acid, methacrylic acid, itaconic acid, maleic acid, fumaric acid, crotonic acid, or an anhydride thereof, as explained above. The at least one (meth)acrylic acid may include one, two, three, four, or more, different (meth)acrylic acid monomers.

In one embodiment, the mixture includes at least two (meth)acrylates selected from acrylic acid, ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol) methyl ether acrylate, or (polyethylene glycol) methyl ether methacrylate; and at least one a (meth)acrylic acid selected from acrylic acid, methacrylic acid, itaconic acid, maleic acid, fumaric acid, and crotonic acid. In one embodiment, the mixture includes methyl methacrylate, methylacrylate, and acrylic acid.

In one embodiment, the mixture and polymerization product, and therefore the HLAC resin, is free of any styrenic monomers.

The above mixtures may include from 0 wt % to about 10 wt % of a styrenic monomer. For example, the HLAC resin may include from 0 wt % to about 10 wt % of a monomer that is styrene or α-methylsytrene. In some embodiments, the mixture includes from 0 wt % to about 5 wt % of a styrenic monomer. In one embodiment, the mixture and polymerization product, and therefore the HLAC resin, is free of any styrenic monomers (i.e. 0 wt %).

The initiator may be added with the monomers and may be added in any appropriate amount. By way of example only, the total amount of initiator added is in an amount of 0 to about 5 wt %. For this purpose, the initiator may be admixed with the monomer feed or added to the process as a separate feed. Briefly, the initiators suitable for carrying out the process are compounds which decompose thermally into radicals in a first order reaction, although this is not a critical factor. The initiators exhibit a suitable half life decomposition temperature appropriate for the chosen reaction temperature and residence time. The initiator may be a thermal initiator. Suitable initiators include, but are not limited to 2,2'-azodi-(2,4-dimethylvaleronitrile), 2,2'-azobisisobutyronitrile (AIBN), 2,2'-azobis(2-methylbutyronitrile), 1,1'-azobis(cyclohexane-1-carbonitrile), tert-butylperbenzoate, tert-amyl peroxy-2-ethylhexyl carbonate, 1,1-bis(tert-amylperoxy)cyclohexane, tert-amylperoxy-2-ethylhexanoate, tert-amylperoxyacetate, tert-butylperoxyacetate, tert-butylperoxybenzoate (TBPB), 2,5-di-(tert-butylperoxy)-2,5-dimethylhexane, di-tert-amyl peroxide (DTAP), di-tert-butylperoxide (DTBP), lauryl peroxide, dilauryl peroxide (DLP), succinic acid peroxide; or benzoyl peroxide. In some embodiments, the polymerization initiator includes 2,2'-azodi-(2,4-dimethylvaleronitrile), 2,2'-azobisisobutyronitrile (AIBN), or 2,2'-azobis(2-methylbutyronitrile). In other embodiments, the polymerization initiator includes di-tert-amyl peroxide (DTAP), di-tert-butylperoxide (DTBP), lauryl peroxide, succinic acid peroxide, or benzoyl peroxide.

As indicated above, the reaction optionally proceeds in a neat mixture of the monomers or in one or more solvents which are then fed into the reactor together with the monomers, or in a separate feed. The solvent may be any solvent known in the art, including those that do not react with the monomers at the reactor temperatures. Such solvents include, but are not limited to xylene; toluene; ethyl-benzene; Aromatic-100®; Aromatic 150®; Aromatic 200®; acetone; methylethyl ketone; methyl amyl ketone; methylisobutyl ketone; n-methyl pyrrolidinone; ethyl-3-ethoxypropionate; Isopar E; propylene glycol monomethylether acetate; ethoxyethoxyethanol; dipropylene glycol monomethylether; n-butanol; n-hexanol; isopropanol; iso-octanol; a long chain fatty alcohol (linear or branched) including lauryl alcohol, cetyl alcohol, or stearyl alcohol; and combinations of any two or more such solvents. When used, the solvents are present in any amount desired, taking into account reactor conditions and monomer feed. In one embodiment, one or more solvents are present in an amount of up to 40% by weight, or up to 15% by weight, in other embodiments, based on the total weight of the monomers.

The reactor is maintained at an effective temperature for an effective period of time to cause polymerization of the monomers to produce the HLAC support resin. Regarding the effective temperature, the continuous polymerization is carried out at relatively high temperatures. In one embodiment, the polymerization temperatures range from about 130° C. to about 270° C. This includes embodiments where the temperatures range from about 170° C. to about 250° C. or from about 170° C. to about 232° C. This also includes embodiments where the temperatures range from about 175° C. to about 250° C. or from about 180° C. to about 232° C. Regarding the effective period of time, a continuous polymerization process allows for a short residence time within the reactor. The residence time is generally less than about one hour, and may be less than about 15 minutes. In some embodiments, the residence time is generally less than about 30 minutes, and may be less than about 20 minutes. In one embodiment, the residence time is about 12 minutes.

The process for producing the HLAC support resins may be conducted using any type of reactor known in the art, and may be set up in a continuous, batch or semi-batch configuration. Such reactors include, but are not limited to, continuous stirred tank reactors ("CSTRs"), tube reactors, loop reactors, extruder reactors, or any reactor suitable for continuous operation including combinations of the above in a process cascade.

In one embodiment, the process of preparing the HLAC support resin includes mixing methyl methacrylate, methyl acrylate, and acrylic acid in isopropanol, and adding an initiator of di-tert butyl peroxide or di-tert amyl peroxide. In a CSTR, the mixture is reacted with a residence time of from 10 to 20 minutes. After reaction, the product resin is removed from the CSTR and exposed to a vacuum to remove the solvent and unreacted monomer.

In another aspect, a composition is provided including any of the HLAC resins as described above. The HLAC resins of the compositions may be further modified by additional polymerization products or emulsion polymerization products. The compositions also include an aqueous medium and a cross-linker. The compositions may further include a base. Illustrative cross-linkers include, but are not limited to, an aziridine, a carbodiimide, oxazoline, epoxy, zinc, or zirconium.

In another aspect, a coating is provided which includes any of the above compositions and an aqueous medium. The aqueous medium is one which is volatile after application of the coating to a substrate, resulting in the coating of the substrate with the composition. Where the coating includes a pigment, the coating may be an ink or a paint. In one embodiment, the coating is an ink.

In one aspect, emulsions are provided which include any of the HLAC support resins above as a protective colloid and a second polymerization product of at least one emulsion polymerizable monomer. The emulsions are prepared by charging a neutralized HLAC support resin (i.e. the HLAC support resin plus a base), dissolved in water, to a reactor (e.g. the first vessel). A solution of the at least one emulsion polymerizable monomer with a surfactant in water are also charged to the reactor. The mixture of the reactants is then agitated at a temperature and for a time sufficient for the reactants to combine and form a HLAC resin supported emulsion.

The at least one emulsion polymerizable monomer may include any monomers that will polymerize under the conditions of the emulsion. Such monomers may include, but are not limited to, (meth)acrylate monomers, styrenic monomers, and vinylic monomers. For example, (meth)acrylate monomers may specifically include, but are not limited to, acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, or vinyl chloride. Illustrative styrenic monomers for use in the preparation of the emulsion include, but are not limited to, styrene, α-methyl styrene, ethyl styrene, isopropyl styrene, and tertiary-butyl styrene. Illustrative vinylic monomers may include vinyl chloride, and the like. In one embodiment, the at least one emulsion polymerizable monomer is a mixture of at least one (meth)acrylate monomer and at least one styrenic monomer.

The preparation of the HLAC resin supported emulsion may be carried out at room temperature or at elevated temperature. For example, the preparation may be carried out from about 25° C. to about 100° C. In some embodiments, the preparation is carried out from about 50° C. to about 90° C. The time period for the reaction may vary from a few minutes to many hours. In some embodiments, the time period is from about 30 minutes to 4 hours. The reaction may be carried out in a batch reactor or in a continuous reactor.

Bases that are useful for neutralizing the HLAC support resin may be any of a wide variety of bases including, but not limited to, ammonia, a mono-, di-, or tri-alkyl amine such as, but not limited to methylamine, ethylamine, dimethylamine, diethyl amine, trimethylamine, triethylamine, methyldiethylamine, ethyldimethylamine, pyridine, piperidine, 4-methylpiperidine, diazabicycloundecene, dimethylethanolamine, sodium hydroxide, and potassium hydroxide.

The emulsions may then be applied to a substrate as a coating. For example, the coatings may also include crosslinking agents, solvents, pigments, curing agents, dispersion agents, drying agents and/or other additives for use as inks or adhesives. Suitable substrates include, but are not limited to, paper, cardboard, fiberboard, wood, plastics, metals, glass, or ceramics. Illustrative crosslinking agents include, but are not limited to, aziridines, carbodiimides, oxazolines, zinc compounds, or zirconium compounds. Suitable solvents include a wide range of solvents for emulsion coatings, including water for low volatile organic coatings.

The inks, coatings, adhesives and emulsions prepared herein, exhibit stability toward prematurely curing, such that the good resolubility characteristics are maintained. For example, the aqueous coating and ink compositions exhibit a less than 25% increase in viscosity after 5 days of storage under ambient conditions, when stored in a closed vessel. Thus, even with when mixed with a cross-linker or curing agent, at ambient conditions, the cross-linking does not progress at an appreciable rate such that the viscosity increases by no more than 25% over 5 days. In some embodiments, the coating or ink compositions exhibit a less than 20% increase in viscosity after 5 days of storage under ambient conditions, when stored in a closed vessel. In some embodiments, the coating or ink compositions exhibit a less than 15% increase in viscosity after 5 days of storage under ambient conditions, when stored in a closed vessel. In some embodiments, the coating or ink compositions exhibit a less than 10% increase in viscosity after 5 days of storage under ambient conditions, when stored in a closed vessel. In some embodiments, the coating or ink compositions exhibit a less than 5% increase in viscosity after 5 days of storage under ambient conditions, when stored in a closed vessel. The smaller the degree of viscosity increase, the longer shelf life the emulsions will exhibit.

The above process for preparing a coating, ink, or adhesive may also include applying the coating composition to a substrate and removing the water to form a coated substrate. The water may be removed from the composition/emulsion at elevated temperature to both aid in drying and aid in curing of the emulsion or coating composition. The elevated temperature may range from about 30° C. to about 100° C. In some embodiments, the elevated temperature is from about 45° C. to about 70° C. In any of the above embodiments, the elevated temperature may be about 60° C.

In another aspect, a substrate coated with a coating or ink is provided. The substrate that is coated with the coating exhibits a Sutherland rub test score of 4 or greater for a Windex® rubbing. In some embodiments, the coating exhibits a Sutherland rub test score of 5 for a Windex® rubbing. The Sutherland rub tests are further described below in the examples, however simply stated, the test provides a measure of coating integrity and adherence to the substrate. Suitable substrates include, but are not limited to, paper, cardboard, wood, polymers, glass, and ceramics. In one embodiment, the substrate comprises polyethylene.

As noted above, the HLAC support resins may be used in emulsions which provide for inks exhibiting good resolubility. Resolubility refers to a combination of the transfer, wetting, adhesion and image resolution properties of a composition, manifesting itself in the ability of the printing head to return to the original print quality after a print stop, by resolvating the drying printing ink. The emulsion compositions provided herein allow for improved resolubility over other polymer compositions presently available for use in ink formulations. Resolubility may be measured and quantified by a laboratory gravure printing set-up. Using such a set-up, the measure for resolubility is the number of prints required to regain the original printing image quality after a defined print-stop. Values for resolubility can range from a theoretical low of 1 print on up into the hundred of prints or even more. For the purposes of this disclosure and the claims which follow, the resolubility of a composition is defined in terms of the following "Resolubility Test." The Resolubility Test uses a Moser type flexographic or gravure printing press. After reaching printing equilibrium, the press is stopped for 5 minutes, then restarted and the number of prints needed to reproduce the original printing quality is counted. The press is run at 20 meters per minute. A white polyethylene substrate with a surface tension of 38-42 dyne is used. The water-based ink is printed using a two-roll printing station. The gravure cylinder has 120 lines per cm. The impression roll has a hardness of 750, a shore printing pressure of 1 bar and measured contact area of 9 mm. An in-line Corona treatment of 500 W is used. Printing is done in a climate controlled room maintained at 50% relative humidity and 22° C. Thermostatically controlled drying ovens set at 60° C. are used after the printing station.

As measured according to this resolubility test, printing inks made from the above emulsion compositions, which in turn employ the HLAC support resins, are capable of restoring at least 95% of original print image quality in 100 prints or fewer. This includes embodiments where printing inks made from the emulsion compositions are capable of restoring at least 95% of original print image quality in 75 prints, or fewer. This includes embodiments where printing inks made from the emulsion compositions are capable of restoring at least 95% of original print image quality in 50 prints, or fewer. This further includes embodiments where printing inks made from the emulsion compositions are capable of completely restoring the original print image quality in less than or equal to 100 prints. This further includes embodiments where printing inks made from the emulsion compositions are capable of completely restoring the original print image quality in from 10 to 80 prints. This further includes embodiments where printing inks made from the emulsion compositions are capable of completely restoring the original print image quality in 5 to 35 prints. This further includes embodiments where printing inks made from the emulsion compositions are capable of completely restoring the original print image quality in 25 to 35 prints.

The present technology, thus generally described, will be understood more readily by reference to the following example, which is provided by way of illustration and is not intended to limit the present technology.

EXAMPLES

Example 1

Preparation of a hydrophilic, low acid content resin. Monomers (as indicated in Table 1) were first weighed out in appropriate amounts and mixed with a solvent to form a clear solution. A free radical initiator was added to the mixture and mixed until the entire solution was clear. The solution was then fed to a continuous stirred tank reactor operating a desired temperature and product continuously withdrawn so as to maintain an appropriate residence time in the reactor. The product from the reactor was continuously charged to an evaporated operating at elevated temperature and under vacuum to remove unreacted monomer and solvent from the resin product. The resin product was then analyzed for molecular weight, glass transition temperature and acid value. The composition of the polymer was estimated by either assuming it was identical to the composition of the monomers in the feed, or by mass balance on the individual monomers fed to the reactor. Oxygen content was calculated from the computed polymer composition.

TABLE 1

Summary of Polymerization Results For Making The Hydrophilic Resins

| Sample | AA (wt. %) | MMA (wt. %) | MA (wt. %) | MPEG (wt. %) | IPA (wt. %) | DTAP (wt. %) | Temp (° C.) | Time (min) | Mn | Mw | AN | $O_2$ |
|---|---|---|---|---|---|---|---|---|---|---|---|---|
| 1 | 14 | 34 | 42 | | 9.5 | 0.5 | 190 | 12 | 3252 | 9335 | 117 | 36.3 |
| 2 | 7 | 41 | 42 | | 9.5 | 0.5 | 193 | 12 | 3228 | 10002 | 56 | 35.4 |
| 3 | 3.5 | 44.5 | 42 | | 9.5 | 0.5 | 189 | 12 | 3333 | 10273 | 33 | 34.9 |
| 4 | 10 | 38 | 42 | | 9.5 | 0.5 | 197 | 12 | 3052 | 8817 | 79 | 35.8 |
| 5 | 7 | 26 | 27 | 30 | 9.5 | 0.5 | 190 | 12 | 2546 | 9397 | 55 | 36.0 |

AA is an abbreviation for acrylic acid.
MMA is an abbreviation for methylmethacrylate.
MA is an abbreviation for methyl acrylate.
MPEG is an abbreviation for (polyethylene glycol) methyl ether acrylate. The actual material had a Mn of 480 Daltons.
IPA is an abbreviation for isopropyl alcohol.
Temp. is the reactor temperature.
Time is the residence time of the polymer in the reactor.
Mn is the number average molecular weight.
Mw is the weight average molecular weight.
AN is the acid number reported in mg KOH (base) per g of resin.
$O_2$ is the oxygen content of the resin in wt %.

Example 2

Typical procedure to make a hydrophilic resin solution from a hydrophilic resin. De-ionized water (1323.31 g) and Resin 2 (see Table 1; 450 g) were charged into a 2 L reactor. An ammonia solution (28% solution in water, 26.69 g) was added to the reactor with stirring at room temperature. The reactor was heated to a temperature of 60° C., and stirred for 3 hours at temperature. The solution was then cooled to room temperature and filtered to produce Resin Solution No. 2.

TABLE 2

Characterization Of Resins Solutions Prepared Using Resins From Table 1.

| | Resin Soln. No. | | | |
|---|---|---|---|---|
| | 1 | 2 | 3 | 4 |
| Resin No. From Table 1. | 3 | 2 | 4 | 1 |
| NV % | 24.79 | 24.59 | 24.87 | 26.72 |
| pH | 8.00 | 7.56 | 8.69 | 7.35 |
| PS Mn (nm) | 10.8 | 10.9 | 8.8 | — |

For comparison a styrene-acrylic copolymer of acrylic acid (4.5 wt %), methyl methacrylate (60 wt %), styrene (14 wt %) and butyl acrylate (21.5 wt %) with an acid number of 35 mg KOH/g and computed oxygen content of 25 wt % was neutralized in water and ammonia with the same procedure as described. However, unlike the resins of Table 1, the styrene-acrylic resin did not dissolve in aqueous solution. Similarly, a co-polymer of acrylic acid (15 wt %), styrene (61 wt %), MPEG acrylate (6 wt %) and α-methyl styrene (18 wt %), having an acid number of 108 mg KOH/g and a computed oxygen content of 9 wt % did not dissolve in aqueous solution. Such styrene-acrylic copolymers lack the hydrophilic character to dissolve in aqueous solution.

Example 3

Emulsion Polymerization Using A Hydrophilic Resin Cut. De-ionized water (172.18 g), resin solution 2 (Table 2; 310.47 g), polyethylene glycol (P 1200, 8.50 g), Tergitol 15-S-7 (7.65 g), and 10% sodium bicarbonate solution (0.77 g) were charged into a 1 L reactor and heated to 85° C. with stirring. Ammonium persulfate (1.53 g) was added with water (9.31 g). A solution of styrene (76.50 g), 2-ethylhexyl acrylate (38.25 g), and butyl acrylate (38.25 g) was fed slowly into the reactor over 60 minutes. Water (6.38 g) was added and the reaction was held for 30 minutes at 85° C. A solution of methyl methacrylate (76.50 g), 2-ethylhexyl acrylate (38.25 g), and butyl acrylate (38.25 g) was fed slowly into the reactor over 50 minutes, followed by the addition of water (13.81 g). The reaction was held at 85° C. for 60 minutes after which it was cooled to 60° C., and a 28% ammonia solution (1.45 g) and water (14.87 g) were added. A biocide (0.43 g) was added at the end followed by cooling the reaction to room temperature, filtering and collecting the product as Emulsion 4. Other resin solutions are presented in Table 2 along with characterization data, and emulsions are presented in Table 4.

TABLE 3

Characterization Of Emulsions Prepared Using Resin Solutions From Table 2.

| | Emulsion No. | | | | |
|---|---|---|---|---|---|
| | 1 | 2 | 3 | 4 | 5 |
| Resin Soln. No. From Table 2 | 2 | 2 | 2 | 2 | 2 |
| % HLAC/MP | 10.0 | 15.0 | 20.0 | 25.0 | 30.0 |
| pH | 8.77 | 8.63 | 8.26 | 7.17 | 7.88 |
| Vis (cp) | 25 | 130 | 17,796 | 109 | 1847 |
| NV % | 45.53 | 47.59 | 47.75 | 47.30 | 47.99 |
| P.S. Dv (nm) | 462.6 | 466.1 | 574.0 | 181.3 | 189.6 |
| P.S. Dn (nm) | 95.2 | 78.9 | 61.7 | 133.6 | 58.3 |
| Theoretical Acid Value | 5 | 7.2 | 9.3 | 11.1 | 12.8 |
| Tg (° C.) | 6.20 | 10.20 | 10.40 | 5.5, 36.2 | 11.3. 42.7 |
| Gloss (60°) | — | — | — | 84.2 | 84 |

Parts Resin is the percentage of resin solids in the neutralized HLAC based upon the total amount of monomers used.
P.S. Dv is the volume average particle size.
P.S. Dn is the number average particle size.
Gloss was measured on films of emulsions drawn down using a K3 wirewound drawdown bar (24 um wet film thickness) on a black opacity chart and allowed to dry at 60° C. for 15 minutes, and averaged over 3 readings.
Theoretical acid value was computed for the total solids based on the acid number of the resin used and amount in the emulsion polymerization.
% HLAC/MT = (weight of resin solids in neutralized HLAC solution)/(weight of total monomer added during emulsion polymerization) × 100

TABLE 4

Emulsions Prepared With Hydrophilic Resins Having Different Levels Of Acid Content.

| | Emulsion No. | | | |
|---|---|---|---|---|
| | 6 | 7 | 8 | 9 |
| Resin Soln. No. From Table 2 | 1 | 1 | 3 | 4 |
| % AA in HLAC | 3.90 | 3.90 | 11.12 | 15.56 |
| % HLAC/MT | 40.0 | 15.0 | 10.0 | 10.0 |
| pH | 7.55 | 8.67 | 9.01 | 9.06 |
| Vis (cp) | 25.0 | 19.0 | 404.9 | 2082.0 |
| NV % | 47.95 | 42.57 | 44.27 | 42.44 |
| P.S. Dv (nm) | 121.6 | 178.0 | 292.8 | 318.6 |
| P.S. Dn (nm) | 81.6 | 136.9 | 139.5 | 159.5 |
| Theo. AN | 9.3 | 4.3 | 7.1 | 10.6 |
| Tg (° C.) | — | — | — | — |
| Gloss (60°) | — | 86.5 | — | — |

MT is the monomer total.

Figure 1:
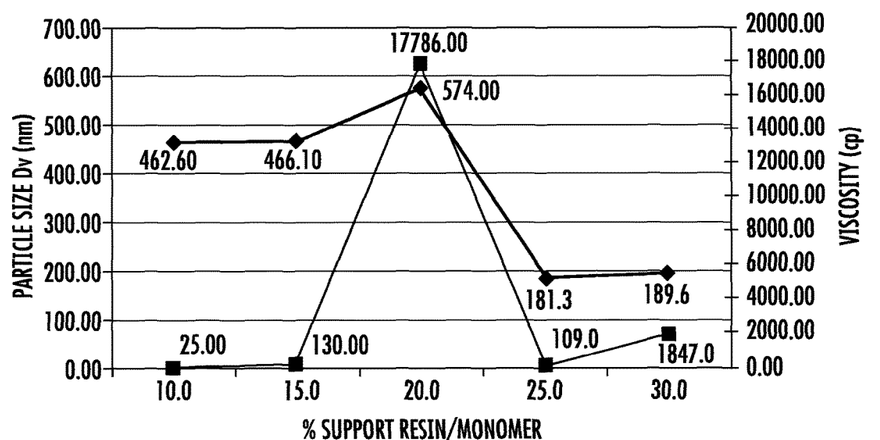
FIG. 1 is a dual graph of particle size and viscosity versus % HLAC support resin, according to the examples.

FIG. 1 is a dual graph of Emulsions 1-5 versus both particle size (Dv) and viscosity (cp). A peak is illustrated at 20 wt % for both, indicating that for at least some emulsion, greater than about 20 wt % of the HLAC resin in the emulsion, smaller particle sizes may be achieved while not substantially affecting the viscosity. The data illustrates that a minimum level of resin must be added to the formulation to provide a low viscosity, low particle size emulsion. Addition of more resin leads to higher final acid number in the polymer solids. However, the acid numbers are all very low using the HLAC resins compared to a system using a conventional high acid resin support.

Example 4

Rub resistance testing of films. Clear films of the emulsions shown in Table 3, were drawn down on leneta card with a drawdown bar (6 μm wet film thickness). The films were allowed to cool at room temperature overnight and tested for rub resistance with water, ethanol and Windex®.

TABLE 5

Windex And Ethanol Rub Resistance Data For Films And Inks Prepared. Ratings Are Based On 0-5 (5 being best, 0 being worst). The data is compared to a control of Joncryl 624, a commercial emulsion available from BASF Corp. The results illustrate that the emulsions prepared with the lower acid hydrophilic resins have better overall chemical resistance than the higher acid controls.

| | Sample Emulsion from Table 3 | | |
|---|---|---|---|
| | 4 | 5 | Control |
| Theo. AN | 11.1 | 12.8 | 50 |
| % Resin/MT | 25 | 30 | n/a |
| Water Rub resistance | 5 | 5 | 4 |
| Windex Rub resistance | 3 | 3 | 1 |
| Ethanol Rub resistance | 3 | 3 | 1 |

Example 5

Typical Ink preparation using HLAC Emulsion. A blue ink is prepared by mixing Flexverse III BGD-3153 blue dispersion (copper phthalocyanine blue 15:3 pigment dispersion from Sun Chemical) with HLAC emulsion at weight ratio of 35:65 with a high speed disperser for 5 minutes. Then, the ink viscosity is then adjusted to 100 mPa·s (cps) by dilution with a color dispersion solution (35/65 color dispersion to water). The ink is typically drawn down using a hand proofer on a polypropylene substrate and allowed to dry overnight at room temperature before testing for resistance properties. The resistance of the films is then measured using scrub resistance to Windex® solutions using a Sutherland Rub Test.

Example 6

Typical Ink preparation using HLAC Emulsion with a crosslinker (PCDI Crosslinker). An HLAC emulsion prepared as in Example 3, is blended with a water-based pigment dispersion to prepare an ink. A polycarbodiimide solution (dispersed in water) is then added to the ink before application onto a substrate. The polycarbodiimide solution is mixed with the ink at a weight ratio of 100 parts ink to 6 parts polycarbodiimide. The ink is applied on polymer substrate and the film is allowed to cure at room temperature or elevated temperatures. The ink is typically drawn down using a hand proofer on a polypropylene substrate and allowed to dry overnight before testing for resistance properties.

Example 7

Typical Metal Coating using HLAC Emulsion. The HLAC emulsion is blended with white titanium dioxide pigment dispersion (60:40 weight ratio) using a high speed disperser for 5 minutes. Solvent (Dowanol DPnB) and water is mixed separately and added to the blend and mixed. The dispersion is drawn down on a metal panel and allowed to dry overnight at room temperature.

EQUIVALENTS

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. A hydrophilic low acid content resin consisting of a polymerization product of a mixture consisting of:
    at least two (meth)acrylates selected from the group consisting of ethyl acrylate, ethyl methacrylate, methyl methacrylate, vinyl acetate, methyl acrylate, glycidyl acrylate, glycidyl methacrylate, propyl acrylate, and propyl methacrylate; and
    at least one a (meth)acrylic acid selected from the group consisting of acrylic acid, methacrylic acid, itaconic acid, maleic acid, fumaric acid, crotonic acid, and an anhydride thereof;
    an initiator; and
    optionally a solvent;
    wherein:
        the mixture has from about 88 wt % to about 99 wt % of the at least two (meth)acrylates, based upon the total weight of monomers in the mixture;
        the resin is water soluble upon neutralization with a base;
        the resin exhibits an acid value from about 20 to about 80 and has an $O_2$ value from 34 to 38; and
        the polymerization product has a weight average molecular weight from about 6,000 g/mol to about 12,000 g/mol.

2. The resin of claim 1, wherein the mixture consists of methyl methacrylate, methyl acrylate, and acrylic acid, and optionally one or more of ethyl acrylate, ethyl methacrylate, vinyl acetate, glycidyl acrylate, glycidyl methacrylate, propyl acrylate, propyl methacrylate, methacrylic acid or an anhydride thereof, itaconic acid or an anhydride thereof, maleic acid or an anhydride thereof, fumaric acid or an anhydride thereof, or crotonic acid or an anhydride thereof.

3. The resin of claim 1, wherein the acid value is from about 20 to about 60.

4. The resin of claim 1, wherein the mixture has from about 3 wt % to about 12 wt % of the at least one (meth)acrylic acid, based upon the total weight of monomers in the mixture.

5. The resin of claim 1 having an 02 value from 34 to 37.

6. A process for forming the hydrophilic low acid content resin of claim 1, the process consisting of:
    forming a mixture consisting of:
        at least two (meth)acrylates selected from the group consisting of ethyl acrylate, ethyl methacrylate, methyl methacrylate, vinyl acetate, methyl acrylate, glycidyl acrylate, glycidyl methacrylate, propyl acrylate, and propyl methacrylate;
        at least one (meth)acrylic acid selected from the group consisting of acrylic acid, methacrylic acid, itaconic acid, maleic acid, fumaric acid, crotonic acid, and an anhydride thereof;
        an initiator; and
        optionally a solvent;
    agitating the mixture until a clear solution is obtained; and
    introducing the clear solution to a reactor held at a temperature sufficient to polymerize the at least two (meth)acrylates and the at least one (meth)acrylic acid and form a hydrophilic, low acid content resin;
    wherein:
        the mixture is free of styrenic monomers;
        the mixture has from about 88 wt % to about 99 wt % of the at least two (meth)acrylates, based upon the total weight of monomers in the mixture;
        the hydrophilic, low acid content resin is water soluble upon neutralization with a base;

the hydrophilic, low acid content resin exhibits an acid value from about 20 to about 80 and an 02 value from 34 to 38; and the hydrophilic, low acid content resin has a weight average molecular weight from about 6,000 g/mol to about 12,000 g/mol.

7. The process of claim 6, wherein the temperature is from about 130° C. to about 270° C.

8. The process of claim 6, wherein the reactor is a continuous stirred tank reactor, a tube reactor, a loop reactor, an extruder reactor, or a combination of any two or more thereof in a process cascade.

9. An emulsion comprising a hydrophilic low acid content resin as a protective colloid, and a second polymerization product of at least one emulsion polymerizable monomer; wherein the hydrophilic low acid content resin is a polymerization product of a mixture consisting of:
   at least two (meth)acrylates selected from the group consisting of ethyl acrylate, ethyl methacrylate, methyl methacrylate, vinyl acetate, methyl acrylate, glycidyl acrylate, glycidyl methacrylate, propyl acrylate, propyl methacrylate, (polyethylene glycol) methyl ether acrylate, and (polyethylene glycol) methyl ether methacrylate; and
   at least one a (meth)acrylic acid selected from the group consisting of acrylic acid, methacrylic acid, itaconic acid, maleic acid, fumaric acid, crotonic acid, and an anhydride thereof;
   an initiator; and
   optionally a solvent;
   wherein:
      the mixture has from about 88 wt % to about 99 wt % of the at least two (meth)acrylates, based upon the total weight of monomers in the mixture;
      the resin is water soluble upon neutralization with a base;
      the resin exhibits an acid value from about 20 to about 80 and has an 02 value from 34 to 38;
      the polymerization product of the mixture is initiated with an initiator, and optionally in the presence of solvent; and
      the polymerization product has a weight average molecular weight from about 6,000 g/mol to about 12,000 g/mol.

10. A coating composition comprising the emulsion of claim 9, an aqueous medium, and a cross-linker.

11. A ink comprising the coating composition of claim 10 and a pigment.

12. The process of claim 6, wherein the mixture consists of methyl methacrylate, methyl acrylate, and acrylic acid, and optionally one or more of ethyl acrylate, ethyl methacrylate, vinyl acetate, glycidyl acrylate, glycidyl methacrylate, propyl acrylate, propyl methacrylate, methacrylic acid or an anhydride thereof, itaconic acid or an anhydride thereof, maleic acid or an anhydride thereof, fumaric acid or an anhydride thereof, or crotonic acid or an anhydride thereof.

13. The process of claim 6, wherein the hydrophilic, low acid content resin exhibits an 02 value from 34 to 37.

14. The process of claim 6, wherein the mixture has from about 3 wt % to about 12 wt % of the at least one (meth)acrylic acid, from about 25 wt % to about 65 wt % of a first (meth)acrylate and from about 30 wt % to about 50 wt % of a second (meth)acrylate, based upon the total weight of monomers in the mixture, and wherein the first (meth)acrylate and the second (meth)acrylate are not the same.

15. A process for preparing the emulsion of claim 9 comprising:
   charging a reactor with a mixture in water comprising:
      the hydrophilic, low acid content resin;
      at least one emulsion polymerizable monomer, and
      a surfactant; and
   agitating the mixture at a reaction temperature and a reaction time period sufficient to form the emulsion, wherein the hydrophilic, low acid content resin is neutralized with a base.

16. The process of claim 15, wherein the reaction temperature is from about 25° C. to about 100° C.

17. The process of claim 15, wherein the at least one emulsion polymerizable monomer is selected from the group consisting of (meth)acrylate monomers, styrenic monomers, and vinylic monomers.

* * * * *